(12) United States Patent
Bosmans et al.

(10) Patent No.: US 6,588,735 B2
(45) Date of Patent: Jul. 8, 2003

(54) GAS-LIQUID TRAY

(75) Inventors: Bernardinus Henricus Bosmans, Amsterdam (NL); Wilhelmus Adrianus Theodorus Uijen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/757,885

(22) Filed: Jan. 10, 2001

(65) Prior Publication Data

US 2001/0030373 A1 Oct. 18, 2001

(30) Foreign Application Priority Data

Feb. 16, 2000 (EP) .......................................... 00200519

(51) Int. Cl.[7] .................................................. B01F 3/04
(52) U.S. Cl. ................. 261/114.1; 261/114.3; 261/114.4
(58) Field of Search .................... 261/114.1, 114.3, 261/114.4, 114.5

(56) References Cited

U.S. PATENT DOCUMENTS

| | | | | |
|---|---|---|---|---|
| 2,247,485 A | * | 7/1941 | Edmister et al. | |
| 2,394,679 A | * | 2/1946 | Gerhold | 261/114.1 |
| 2,682,395 A | * | 6/1954 | Claridge et al. | 261/114.1 |
| 3,103,545 A | * | 9/1963 | Korelitz | 261/114.1 |
| 3,410,540 A | * | 11/1968 | Bruckert | |
| 3,463,464 A | | 8/1969 | Nutter et al. | 261/114 |
| RE27,908 E | | 1/1974 | Nutter et al. | 261/114 |
| 4,105,723 A | * | 8/1978 | Mix | 261/114.1 |
| 4,550,000 A | | 10/1985 | Bentham | 261/114 |
| 4,627,941 A | * | 12/1986 | Bentham | 261/114.1 |
| 5,098,615 A | | 3/1992 | Resetarits | 261/114.3 |
| 5,120,474 A | | 6/1992 | Binkley et al. | 261/114.4 |
| 5,223,183 A | | 6/1993 | Monkelbaan et al. | 261/114.1 |
| 5,318,732 A | | 6/1994 | Monkelbaan et al. | 261/114.1 |
| 5,382,390 A | | 1/1995 | Resetarits et al. | |
| 5,454,989 A | * | 10/1995 | Nutter | 261/114.1 |
| 5,702,647 A | | 12/1997 | Lee et al. | |
| 5,911,922 A | | 6/1999 | Hauser et al. | 261/114.4 |

FOREIGN PATENT DOCUMENTS

| | | | | |
|---|---|---|---|---|
| BE | 584426 | | 11/1959 | |
| DE | 764103 | * | 9/1952 | 261/114.1 |
| DE | 1801538 | * | 6/1970 | 261/114.1 |
| EP | 0155056 A2 | | 9/1985 | |
| EP | 0155056 B1 | | 7/1989 | |
| GB | 1416731 | | 12/1975 | |
| GB | 1416732 | | 12/1975 | |
| GB | 1422131 | | 1/1976 | |
| GB | 1422132 | | 1/1976 | |
| SU | 421331 | * | 9/1974 | 261/114.1 |
| WO | 95/25583 | | 9/1995 | |
| WO | 9626779 | | 9/1996 | |
| WO | 9737741 | | 10/1997 | |
| WO | 9828056 | | 7/1998 | |

* cited by examiner

*Primary Examiner*—C. Scott Bushey

(57) ABSTRACT

This invention relates to a gas-liquid contact tray having a bubble area and a downcomer having a downcomer opening, in which a self-draining vent tube is present in the downcomer and fluidly connects the upper portion of the downcomer with a space above the tray.

12 Claims, 3 Drawing Sheets

GAS-LIQUID TRAY

FIELD OF THE INVENTION

The invention is directed to an improved gas liquid contacting tray comprising a bubble area, a weir and a downcomer opening. Such trays can be used in gas liquid contacting devices. A typical use of these trays is as distillation column internals.

BACKGROUND OF THE INVENTION

When trying to increase the liquid and/or gas flows in such distillation columns a maximum load will be observed. Higher loads will result in that the column fails to function as a liquid-gas contactor or separator due to a phenomena known as flooding. Flooding is described as excessive accumulation of liquid inside the column. The well known flooding mechanisms are downcomer back-up, jet flooding and downcomer choking. These mechanisms are described in Distillation Design, Henry Z. Kister, McGraw-Hill Inc, 1992, pages 267–291. According to this publication downcomer back-up is due to a build-up of liquid inside the downcomer causing the liquid to back-up on the tray leading to liquid accumulation on that tray. The liquid height in the downcomer is determined by the tray pressure drop, liquid height on the tray and frictional losses in the downcomer and downcomer slot area. Jet flooding or entrainment flooding is caused by an excessive gas velocity leading to the entrainment of liquid, either by droplets or froth, to the tray above. The liquid will accumulate, leading to flooding. Downcomer choking is caused by an excessive aerated liquid velocity in the downcomer. At a certain velocity the friction losses in the downcomer and downcomer entrance become excessive, and the frothy mixture cannot be transported to the tray below, causing liquid accumulation on the tray. The term froth is to be understood as any gas-liquid mixture present on the tray not depending on any flow regime.

U.S. Pat. No. 2,247,485 describes a tray which aims to overcome the above problem of downcomer inlet choking for a bubble cap tray by providing a vent which fluidly connects a space just below the downcomer opening and near the weir and the space above the tray. The vent as shown in the figure of said publication consists of a horizontal tube placed parallel to the weir and having openings to the space just below the downcomer opening and near the weir. The ends of the horizontal tube extend upwards and have an opening in the space above the tray. In the specification it is stressed that the vent tube is installed below the tray in order to avoid any interference with the flow of the fluid across the bubble area and the weir. U.S. Pat. No. 2,247,485 describes a tray having bubble cap openings in the bubble area of the tray. These openings result in that the predominant hydrodynamic regime above the tray, when in use, can be described as bubble regime as defined on pages 322–336 of Kister.

A disadvantage of the method as disclosed in U.S. Pat. No. 2,247,485, published in 1941, is that the vent tube is not evidently self-draining. Especially when using a gas-liquid contacting column having bubble area openings, which are typically operated in the mixed froth and/or spray regime (see also Kister pages 322–336), it is expected that more liquid droplets will be present in the downcomer and consequently enter the vent tube. Thus one skilled in the art will not readily use this vent tube because it is expected that liquid droplets will enter the vent tube and consequently disrupt the working of the vent tube. Another disadvantage is that if such a vent tube is to be used in very elongated downcomers the tube length of one vent tube will become very long. Because of the resulting pressure drop one skilled in the art will not expect an optimal working.

The problem to be solved by the present process is to provide a tray which overcomes the problem of downcomer inlet choking and which tray does not have the disadvantages accompanied with the design of U.S. Pat. No. 2,247,485.

This object is achieved with the following gas-liquid contact tray comprising a bubble area and a downcomer having a downcomer opening, wherein a self-draining vent tube is present in the downcomer and fluidly connects the upper portion of the downcomer with a space above the tray.

SUMMARY OF THE INVENTION

Applicants have found that the tray according to the invention shows a capacity improvement when compared to a tray not having a vent tube. As is clear from the description of the improved tray a vent tube is placed in a region where it could interfere with the flow of the liquid across the bubble area and the weir. It is thus surprising that a tray is obtained, having the improved capacity, in view of the teaching of U.S. Pat. No. 2,247,485 which teaching dissuades placing the vent tube in that region. A further advantage of the present invention is that the vent tube can also be used as a support, thereby simplifying the design of the tray. Another advantage is that existing trays may be simply modified by adding a vent tube to obtain a tray according to the invention. By retrofitting existing trays in this fashion a significant capacity increase of existing distillation columns can be simply achieved.

BRIEF DESCRIPTION OF THE FIGURES

The invention will be further illustrated by making use of FIGS. 1–4.

DETAILED DESCRIPTION OF THE INVENTION

Figure 1:
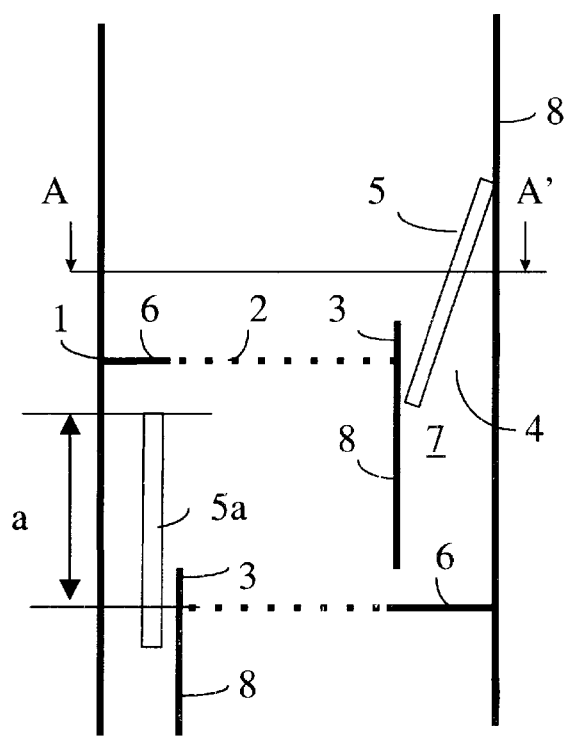
FIG. 1 is a cross-sectional view along the longitudinal axis of a distillation column showing the gas-liquid tray according to the invention.

When the tray according to the invention is used, liquid will flow across the bubble area from a liquid receiving area, the position where the liquid from the tray above flows downward onto said tray, to the downcomer opening. When this liquid flow enters the downcomer, a gas pocket is observed at the upper end of the downcomer wall nearest the bubble area. In the case of a downcomer having a bubble area at more than one side, for example rectangular shaped downcomers, a vapour pocket will be observed at each elongated downcomer wall nearest its respective bubble area. The lower opening of the vent pipe is preferably positioned in this vapour pocket. In the case of a downcomer wherein liquid enters from only one direction, the lower end of the vent tube is preferably positioned in the upper half of the downcomer and within 50% of the maximum downcomer width from the imaginary vertical plane through the boundary of bubble area and downcomer opening. In the case of a rectangular downcomer, wherein liquid enters from two sides, the vent tube is preferably positioned in the upper half of the downcomer and within 25% of the downcomer width, at tray level, from the imaginary vertical plane through the boundary of bubble area and downcomer opening. In a preferred embodiment, the vent pipe extends from this position to a position above the downcomer opening. The position of the upper opening of the vent tube is preferably between 50–95% of the tray spacing above the tray. Tray spacing means the distance between two consecutive contacting trays. Suitably the tray spacing is between 0.2–1 m.

A self-draining vent tube is suitably a tube not having horizontal parts in which fluid may accumulate. Preferably the tube is vertically positioned or inclined to the vertical by at most 45 degrees. The diameter of the tube will be dependent on the liquid gas system and hydrodynamic regime present on the tray. Preferably the hydraulic diameter of the tube is greater than 10 mm, more preferably greater than 15 mm. Typical dimensions of the hydraulic diameter are between 15 and 75 mm. Although in this description the word "tube" is used, one will readily understand that the cross-sectional form of the vent conduit is not critical and that the form may be freely chosen from other forms for example oval, rectangular or pentagonal forms.

Preferably a weir is present on the tray. A weir is a device positioned on or about on the boundary of the bubble area and the downcomer opening which ensures that a certain pre-selected amount of liquid is present on the upper surface of the tray or bubble area. An example of a weir is a downcomer wall nearest the bubble area extending above the tray surface. Preferably per tray at least 2 vent tubes are present per meter of weir length, or in the absence of a weir, per length of boundary between bubble area and downcomer opening.

For the present invention it is not critical which kind of gas openings are used in the bubble area of the tray. However the advantages of the invention are more evident for those trays which are operated in the bubble or mixed froth regime. Openings associated with these regimes are sieve tray openings, valve tray openings and fixed valve openings. Examples of these openings can be found in general text books such as the aforementioned Kister textbook on pages 260–267 and in U.S. Pat. No. RE-27,908, U.S. Pat. No. 5,120,474, WO-A-9828056, WO-A-9737741, U.S. Pat. Nos. 5,911,922, 3,463,464 and 5,454,989.

The shape of the downcomer opening is not critical to achieve the advantages of the present invention. This shape may for example be circular, rectangular, segmental or square. The vertical shape of the downcomer is also not critical for the present invention. The downcomer wall may optionally be inclined relative to the vertical axis of the column in which the trays are used. The invention is suitably used for trays having more than one downcomer. Such multiple downcomer designs may for example be those described in GB-A-1422132, GB-A-1422131, GB-A-1416732, GB-A-1416731, BE-584426, U.S. Pat. No. 4,550,000, WO-9626779, U.S. Pat. Nos. 5,382,390, 3,410,540, 5,318,732, EP-A155056, U.S. Pat. Nos. 5,223,183 and 5,098,615. The downcomer opening is preferably a rectangular downcomer having a width which is smaller than its length, because with such a downcomer opening the advantages of the invention are even more apparent.

Along the elongated center of a rectangular downcomer a vertical anti-jump baffle plate may suitably be present, as illustrated in U.S. Pat. No. 5,382,390, dividing the downcomer opening in two elongated sections. In such a configuration it is advantageous to have vent tubes present in both downcomer opening sections, preferably in such a manner that they support the baffle plate from both sides.

The rectangular downcomers may have sloped downcomer walls or vertical walls. Rectangular downcomers may suitably be used in a so-called staggered arrangement on the tray. In this arrangement the tray is divided along a horizontal diametrical line in two tray sections, each tray section provided with more than one parallel arranged downcomer positioned perpendicular to the diametrical line. These downcomers extend from the wall, or near to the wall, to the diametrical line of the tray, such that the ends of the downcomers in one tray section meet the diametrical line alternating with the ends of the downcomers in the opposite tray section. Preferably 1–10 rectangular shaped parallel downcomers are present in one tray section. Additionally one or more segmental downcomers may be present in a tray section where the diametrical line meets the column wall. The term "rectangular downcomers" is also understood to mean downcomers having a smaller end which runs along the circumferential of the tray. Although the downcomer opening is not fully rectangular the overall shape is rectangular for this invention.

When the staggered trays are placed in a column two consecutive trays will be mirror images of each other with the diametrical line as mirror. This results in the lower end of the downcomer being positioned above the liquid receiving area of the tray below. A staggered tray is preferably constructed such that the downcomer box is supported at one smaller end by a central supporting beam placed along the diametrical line and at the other end by a circumferential beam running along the inner wall of the column. An example of such a staggered tray layout is described in GB-A-1422131.

Referring now to the figures, FIG. 1 shows a gas-liquid contact tray 1 comprising a bubble area 2, a weir 3, a downcomer opening 4, a downcomer wall 8 and a liquid receiving area 6. In the downcomer opening 4 a vent tube 5 is present, inclined relative to the vertical column axis. The lower end of the vent tube 5 is located in the upper part of the downcomer 7 just below weir 3. The upper part of the vent tube 5 is located above tray 1, pointing away from the bubble area 2. A vertical vent tube is shown 5a which is located at a distance a above tray 1.

Figure 2:
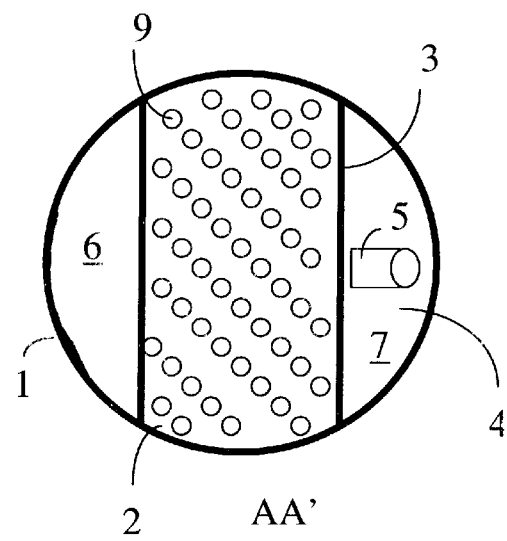
FIG. 2 is a horizontal cross-sectional view of a column of FIG. 1.

FIG. 2 shows tray 1 of FIG. 1 having openings 9 in the bubble area 2 and the vent tube 5 and its upper opening.

Figure 3:
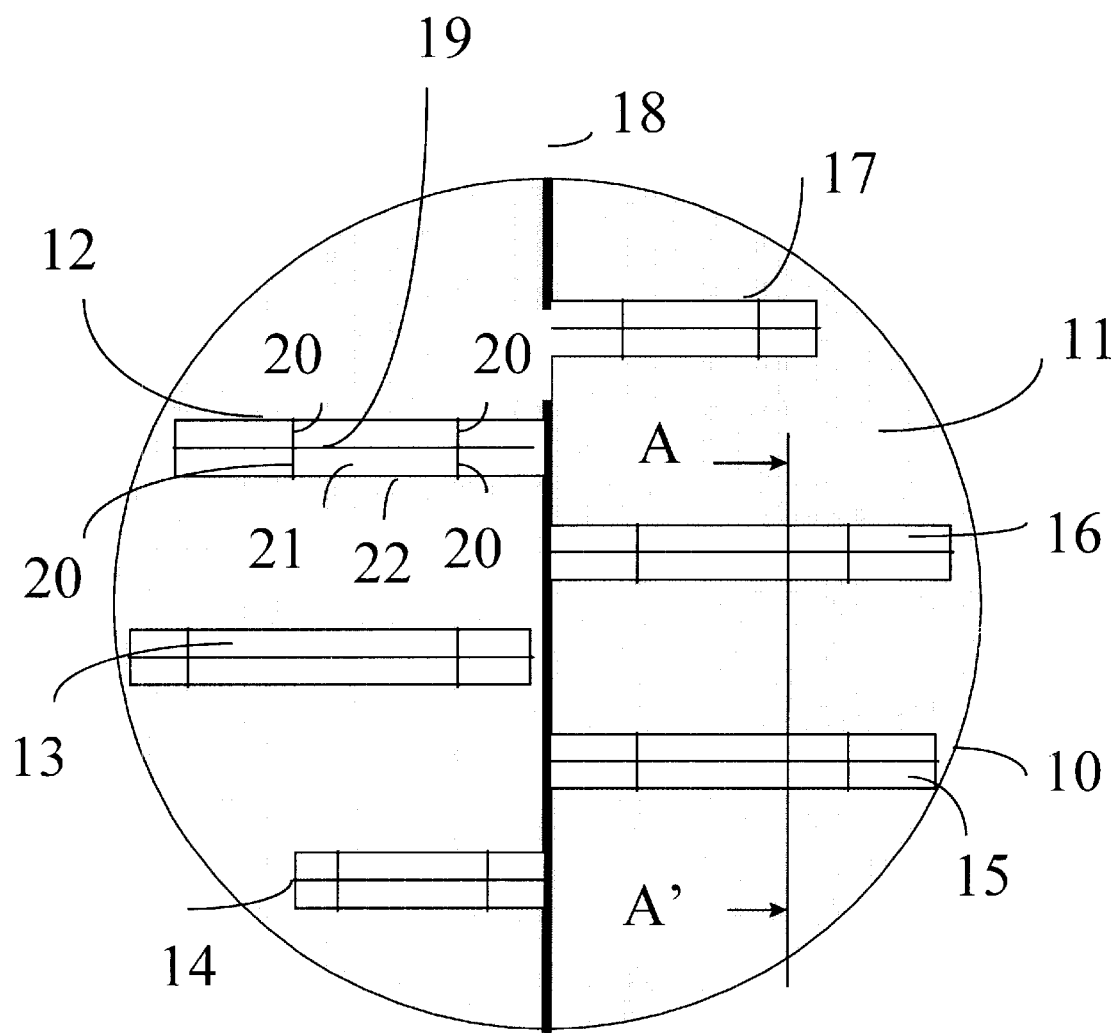
FIG. 3 shows a top view of a tray according to the invention having multiple rectangular downcomers.

FIG. 3 shows a top view of a tray 10 according to the invention having 6 rectangular downcomers 12, 13, 14, 15, 16, 17 and a bubble area 11. These downcomers in the tray are positioned asymmetrically along diametrical line 18. By positioning two consecutive identical trays 10 at a 180 degrees angle relative to each other in a column results in the downcomer outlet opening being positioned just above the liquid receiving area. Each downcomer is provided with an anti-jump baffle plate 19, which baffle plate is supported by vent pipes 20, in the downcomer opening 21. The figure also shows the top of weir 22.

Figure 4:
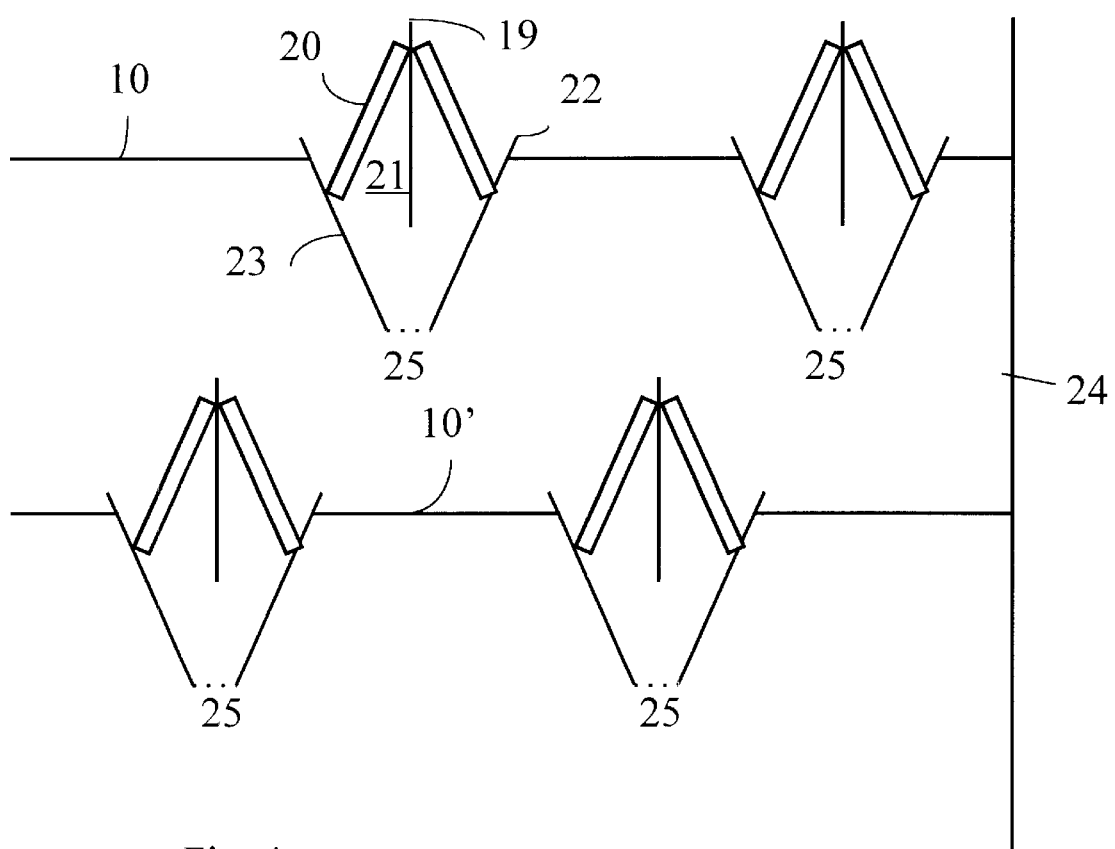
FIG. 4 is a cross-sectional view of part of the tray of FIG. 3 showing also one tray just below said tray.

FIG. 4 shows a cross-section AA' of FIG. 3, wherein also the downcomer wall 23, part of the column wall 24 is shown and the tray 10' just below tray 10 having bubble area below the outlet opening of the downcomers of tray 10. Preferably no gas openings are present in the bubble area just below the liquid discharge openings 25.

The tray according to the invention is preferably used in a gas-liquid contacting column, which column is provided with these trays, axially spaced away from each other. Preferred gas-liquid contacting columns are distillation and absorption columns. In absorption processes a downwardly moving liquid is contacted with an upwardly moving gas and one or more components is transferred from the gas to the liquid or vice versa. In a distillation process one or more components are separated from a feed due to differences in their boiling points. Typically the feed of a distillation process is supplied to an intermediate position in the column, wherein trays are present above and below said inlet position. Such a column is further provided with reboiler, condensation and reflux means.

Because of the simplicity of the vent tube it is very easy to install such a tube in an existing tray and arrive at a tray according to the invention. In this manner a simple method of increasing the capacity of an existing distillation column is provided for. The invention shall be illustrated by the following non-limiting examples.

EXAMPLE 1

A distillation column provided with normal sieve trays having one downcomer opening and a weir was provided with a vertical vent tube in the downcomer opening having a diameter of 0.035 m and a height of 70% of the tray distance above the tray. At a gas load of 250 m$^3$/h it was observed that the maximum liquid load was 20.2 m$^3$/h. At higher liquid loads downcomer choking was observed.

Comparative Experiment A

Example 1 was repeated except that no vent tube was present. At a gas load of 250 m$^3$/h it was observed that the maximum liquid load was 15.7 m$^3$/h. At higher liquid loads downcomer choking was observed. From these results it can be observed that the tray according to the invention has a 28% higher liquid capacity than the state of the art tray exemplified in this comparative experiment.

We claim:

1. A gas-liquid contact tray comprising:
   a liquid receiving area;
   a bubble area connected to the liquid receiving area;
   a downcomer, comprising an upper half with a downcomer opening, perpendicularly connected at a boundary to the bubble area; and,
   a self-draining vent tube, comprising an upper end and a lower end, which lower end is arranged in the upper half of the downcomer near the bubble area, in fluid connection with the downcomer and a location above the tray, wherein the self draining vent tube is vertically inclined such that the upper end points away from the boundary of the bubble area and the downcomer.

2. The tray of claim 1 in which the vent tube is inclined relative to a vertical position by an angle of 45 degrees.

3. The tray of claim 1 in which a weir is present at the boundary of the bubble area and the downcomer.

4. The tray of claim 3 in which the lower end of the vent tube is located just below the weir.

5. The tray of claim 3 in which the vent tube is inclined relative to a vertical position by an angle of 45 degrees.

6. The tray of claim 3 in which the vent tube has a hydraulic diameter of more than 0.015 m.

7. The tray of claim 1 in witch the vent tube has a hydraulic diameter of more than 0.015 m.

8. The tray of claim 1 in which at least 2 vent tubes are present per length of the boundary between the bubble area and the downcomer opening.

9. The tray of claim 3 in which at least 2 vent tubes are present per meter of weir length.

10. The tray, according to claim 8 which the downcomers are also provided with a vertical anti-jump baffle plate along the length of the downcomer dividing the downcomer opening in two longitudinal downcomer opening sections, both sections provided with one or more vent tubes in such a manner that they support the baffle plate from both sides.

11. The tray of claim 1 in which a plurality of downcomer are present on the tray;
   each downcomer is rectangularly formed having a width and a length, each width being smaller than the length; and,
   the downcomers are isolated from each other by bubble area.

12. The tray of claim 1, in which the bubble area is selected from the group of tray types consisting of:
   a sieve tray type, and valve tray type and a fixed valve tray type.

* * * * *